(12) United States Patent
Gaerke et al.

(10) Patent No.: US 12,091,109 B2
(45) Date of Patent: Sep. 17, 2024

(54) CART WITH UNLOADING CONVEYOR

(71) Applicants: Derek Gaerke, Fort Recovery, OH (US); Michael Gaerke, Fort Recovery, OH (US)

(72) Inventors: Derek Gaerke, Fort Recovery, OH (US); Michael Gaerke, Fort Recovery, OH (US)

(73) Assignee: DM Carts LLC, Fort Recovery, OH (US)

( * ) Notice: Subject to any disclaimer, the term of this patent is extended or adjusted under 35 U.S.C. 154(b) by 364 days.

(21) Appl. No.: 17/380,365

(22) Filed: Jul. 20, 2021

(65) Prior Publication Data

US 2022/0017134 A1    Jan. 20, 2022

Related U.S. Application Data

(60) Provisional application No. 63/053,885, filed on Jul. 20, 2020.

(51) Int. Cl.
*B62B 3/04* (2006.01)
*B60P 1/38* (2006.01)
(Continued)

(52) U.S. Cl.
CPC .............. *B62D 51/005* (2013.01); *B60P 1/38* (2013.01); *B62B 3/04* (2013.01); *B62B 3/12* (2013.01); *B62D 51/02* (2013.01); *B62B 2203/72* (2013.01)

(58) Field of Classification Search
CPC ... B60P 1/38; B60P 9/00; B62B 3/003; B62B 3/005; B62B 3/04; B62B 2203/70;
(Continued)

(56) References Cited

U.S. PATENT DOCUMENTS 1,178,137 A * 4/1916 Curtis ...................... B60P 1/38
414/439
2,275,799 A    3/1942 Oklejas
(Continued)

FOREIGN PATENT DOCUMENTS

DE    202012010880 U1 *  3/2013 ............. A01D 90/10
FR    2 470 025             5/1981
(Continued)

OTHER PUBLICATIONS

Barn Boss USA, Barn Boss III, Revolutionary Equipment, product overview; 1 page, accessible at https://www.barnbossusa.com/equipment (at least as early as Apr. 2020).
(Continued)

*Primary Examiner* — James Keenan
(74) *Attorney, Agent, or Firm* — Thompson Hine LLP

(57) ABSTRACT

A conveyance device including a frame and at least one wheel coupled to the frame. The device further includes a storage compartment coupled to the frame, where the storage compartment has a pair of opposed side walls configured such that at least a portion of at least one side wall has an upper edge that is less than 49 inches above a bottom of the wheel to enable manual loading of the storage compartment. The conveyance device further includes a conveyor positioned in the storage compartment, wherein the conveyor is positioned to convey items in the storage compartment at least partially upwardly and out of the storage compartment.

20 Claims, 5 Drawing Sheets

(51) Int. Cl.
*B62B 3/12* (2006.01)
*B62D 51/00* (2006.01)
*B62D 51/02* (2006.01)

(58) Field of Classification Search
CPC ... B62B 2203/72; B62B 3/12; B62D 33/0625; B62D 51/005; B62D 51/02; A01D 90/10; B52D 33/0625; B52D 51/005; B52D 51/02
USPC .................................................. 414/437–440
See application file for complete search history.

(56) References Cited

U.S. PATENT DOCUMENTS

| | | | | |
|---|---|---|---|---|
| 2,325,731 | A * | 8/1943 | Arentzen | E21F 13/025 |
| | | | | 180/234 |
| 2,599,838 | A * | 6/1952 | Kandoll | B60P 1/38 |
| | | | | 198/304 |
| 2,609,116 | A * | 9/1952 | Beck | B60P 1/38 |
| | | | | 414/528 |
| 2,855,061 | A * | 10/1958 | Lilienthal | B62B 3/009 |
| | | | | 180/230 |
| 3,421,647 | A * | 1/1969 | Seymour | B60P 1/38 |
| | | | | 180/19.1 |
| 3,566,985 | A * | 3/1971 | Triplett | B62D 61/08 |
| | | | | 180/253 |
| 4,076,061 | A * | 2/1978 | Greeninger | B27L 7/00 |
| | | | | 144/195.1 |
| 4,211,297 | A * | 7/1980 | Dunbar | G01G 23/01 |
| | | | | 280/124.109 |
| 4,221,524 | A * | 9/1980 | Morris | B62B 3/04 |
| | | | | 414/439 |
| 5,466,112 | A | 11/1995 | Feller | |
| 6,155,648 | A * | 12/2000 | Dombek | B60K 15/063 |
| | | | | 298/1 C |
| 7,201,453 | B2 * | 4/2007 | Vandewinckel | B62D 51/04 |
| | | | | 296/10 |
| 7,641,285 | B2 * | 1/2010 | Jacobs | B62D 33/0625 |
| | | | | 298/22 C |
| 8,585,343 | B2 * | 11/2013 | Wood | B60P 1/42 |
| | | | | 414/523 |
| D752,307 | S | 3/2016 | Wyse et al. | |
| D752,308 | S | 3/2016 | Wyse et al. | |
| D752,834 | S | 3/2016 | Wyse et al. | |
| D752,835 | S | 3/2016 | Wyse et al. | |
| D752,836 | S | 3/2016 | Wyse et al. | |
| D752,837 | S | 3/2016 | Wyse et al. | |
| D779,762 | S | 2/2017 | Wyse et al. | |
| D779,765 | S | 2/2017 | Wyse et al. | |
| D781,020 | S | 3/2017 | Wyse et al. | |
| 9,585,522 | B1 * | 3/2017 | Brown, Sr. | B62B 3/04 |
| 9,809,263 | B2 | 11/2017 | Mitchell et al. | |
| 10,106,213 | B2 | 10/2018 | Mitchell et al. | |
| 10,292,334 | B2 | 5/2019 | Scremin et al. | |
| 10,308,158 | B2 | 6/2019 | Quenzi et al. | |
| 11,001,185 | B2 * | 5/2021 | Orlov | B60P 1/38 |
| 2021/0054580 | A1 * | 2/2021 | Neisen | E01C 19/20 |

FOREIGN PATENT DOCUMENTS

| | | | | |
|---|---|---|---|---|
| FR | 3 023 253 | | 1/2016 | |
| GB | 1018756 | | 2/1966 | |
| GB | 2159790 | | 12/1985 | |
| KR | 20090014441 | A * | 2/2009 | ............. A01D 90/10 |

OTHER PUBLICATIONS

Overland Power Carts, Overland Electric Powered Wagon—9cu. Ft. Hopper with Power Dump, product overview; pp. 1-10; https://www.overlandcarts.com/electric-hand-carts/ (at least as early as Apr. 2020).

Granite Industries, Overland Electric Powered Ride on Wheelbarrow with 10 Cu. Ft Hopper, product overview; 1 page, accessible at https://store.graniteind.com/product/overland-electric-powered-ride-on-wheelbarrow-with-10-cu-ft-hopper (at least as early as Apr. 2020).

Snapper; 82-Volt Max* Lithium-Ion Cordless Self-Propelled Utility Cart, product overview; 5 pages; accessible at https://www.snapper.com/na/en_us/product-catalog/residential/electric-products/other-products/82volt-max-lithiumion-cordless-selfpropelled-utility-cart.html (at least as early as Apr. 2020).

SuperHandy Store; SuperHandy Wheelbarrow Utility Cart Electric 24V DC 330lbs Max Load Barrel Dump Material Debris Hauler, product overview; 10 pages; accessible at Amazon.com Super Handy Store (at least as early as Apr. 2020).

Decko Products; Power Assist Electric Wheelbarrow PAW—200 lb and 300 lb capacity, product overview; 1 page; accessible at https://www.gcsupply.com/shop-by/brand/decko-products.html (at least as early as Apr. 2020).

Land Works; Landworks Utility Cart Hand Truck Power Wagon Super Duty Electric 48V DC 500W AGM Battery Max 500Lbs Load and 1000Lbs Hauling, product overview; 13 pages; accessible at Amazon.com LandWorks (at least as early as Apr. 2020).

Makita; Makita XUC01X1 36-Volt LXT Brushless Cordless Wheelbarrow—Bare Tool, product overview; 2 pages; accessible at https://www.factoryauthorizedoutlet.com/products/makita-xuc01x1-36-volt-lxt-brushless-cordless-wheelbarrow-bare-tool?gclid=Cj0KCQiA0NfvBRCVARIsAO4930mlvP85W1iDhZ0uhl1pRs0EWybyuXU1_ehaCBUbvEhWkX4nqL5oPxwaAmdMEALw_wcB (at least as early as Apr. 2020).

Northern Tool + Equipment; Vestil Traction-Drive Top Load Cart—750-Lb. Capacity, Model# NE-CART-2, product overview; 2 pages; available at https://www.northerntool.com/ (at least as early as Apr. 2020).

PowerPusher; E-750 Electric Wheelbarrow, product overview; 4 pages; accessible at https://powerpusher.com/products/e-750-electric-wheelbarrow/ (at least as early as Apr. 2020).

Greenworks; Greenworks GC40L410 40V Garden Cart with 4Af Battery and Charger, product overview; 15 pages; available at Amazon.com Greenworks (at least as early as Apr. 2020).

* cited by examiner

CART WITH UNLOADING CONVEYOR

This application claims priority to U.S. Provisional Patent Application Ser. No. 63/053,885, filed on Jul. 20, 2020 and entitled Cart with Unloading Conveyer, the entire contents of which are hereby incorporated by reference.

The present application is directed to a cart, and more particularly, to a cart with a conveyor which can be operated to unload the cart.

BACKGROUND

Carts are often used to transport various items, such as rocks, mulch, dirt, construction materials, landscaping materials and agricultural materials such as tools, animals or animal carcasses, etc. In many existing carts, the items to be transported are manually loaded into the cart, and the cart is then transported to the unload location. The items are then typically manually unloaded or, in some cases, the bed of the cart can be tipped in the manner of a dump truck to unload the contents. However, these unloading processes can be labor intensive or, in the case of a tippable bed, results in a low unload point which can limit the utility of the cart.

SUMMARY

Accordingly, in one embodiment the present invention is a cart which can be easily unloaded and which can provide a relatively high unload point. More particularly, in one embodiment the invention is a conveyance device including a frame and at least one wheel coupled to the frame. The device further includes a storage compartment coupled to the frame, where the storage compartment has a pair of opposed side walls configured such that at least a portion of at least one side wall has an upper edge that is less than 49 inches above a bottom of the wheel to enable manual loading of the storage compartment. The conveyance device further includes a conveyor positioned in the storage compartment, wherein the conveyor is positioned to convey items in the storage compartment at least partially upwardly and out of the storage compartment.

DETAILED DESCRIPTION

Figure 1:
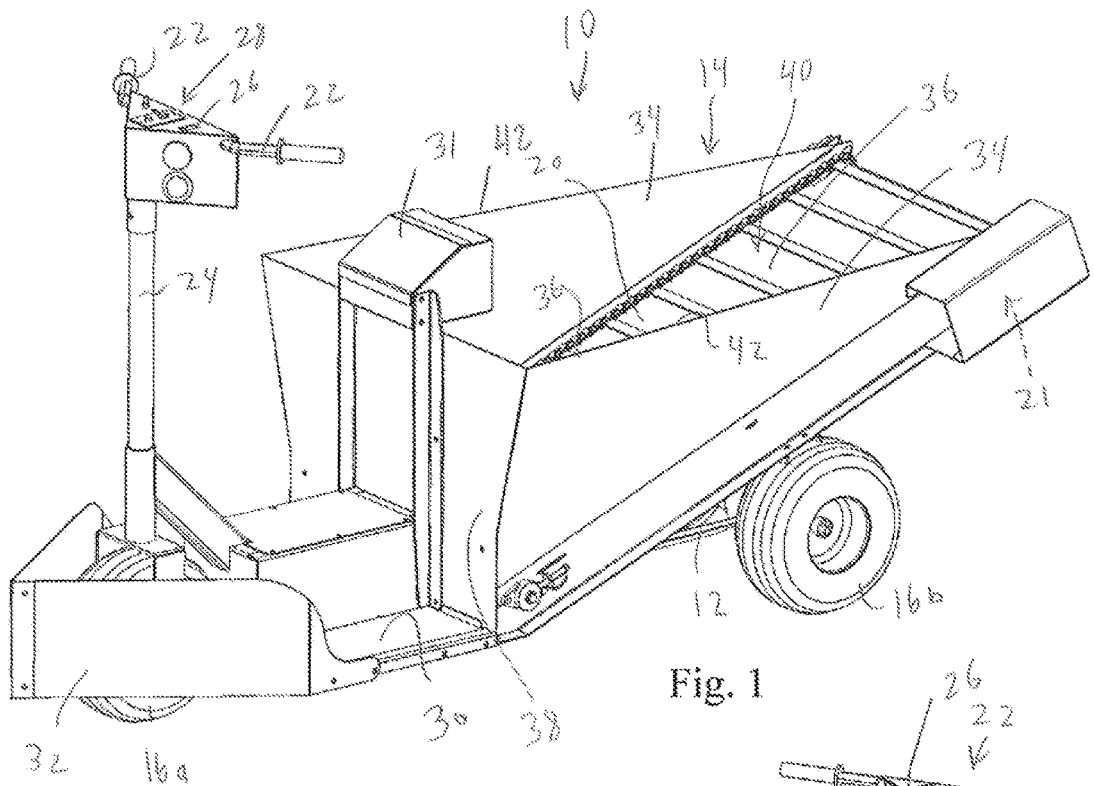
FIG. 1 is a front perspective view of one embodiment of the cart of the present invention.
Figure 2:
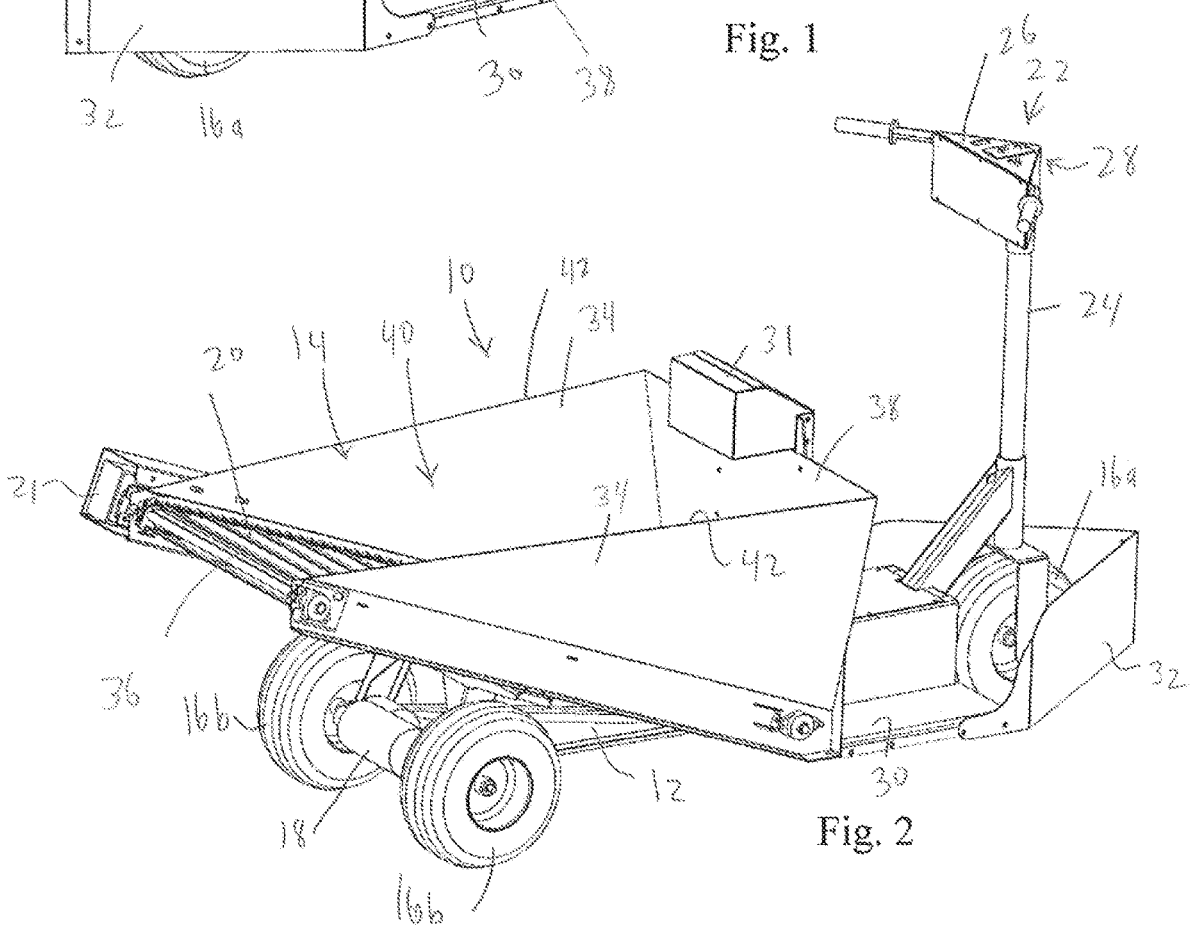
FIG. 2 is a rear perspective view of the cart of FIG. 1.
Figure 3:
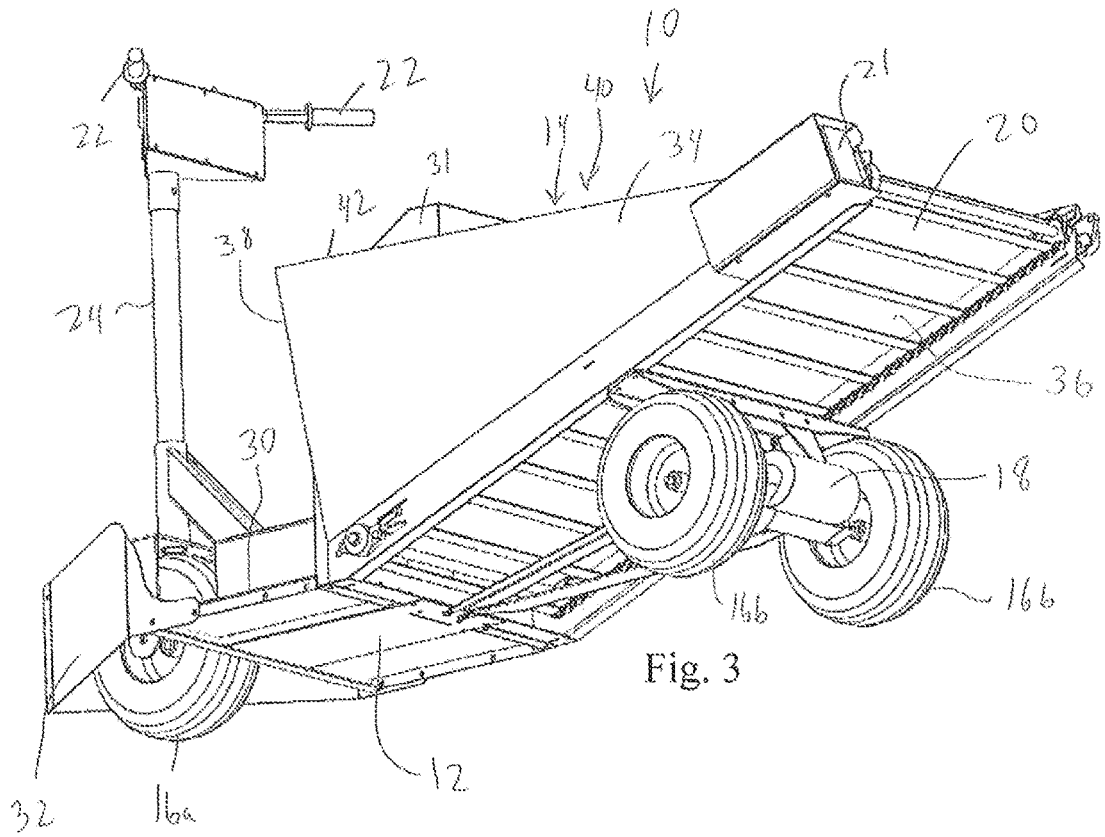
FIG. 3 is a bottom perspective view of the cart of FIG. 1.

As shown in FIGS. 1-9, in one embodiment the cart or conveyance device 10 includes a frame 12 with a storage compartment 14 coupled to the frame 12. The cart 10 includes one or more wheels 16 coupled to the frame 12 to enable the cart 10 to roll on the wheels 16. In the illustrated embodiment the cart 10 includes a single front wheel 16a mounted at or near the front of the cart 10 and a pair of rear wheels 16b mounted at or near the back of the cart 10, and on a common axle. The cart 10 can include a motor 18 (FIG. 3), such as an electric motor, directly coupled to the frame 12 and mounted on or about the rear axle in one case to propel the cart 10 and/or power the conveyor 20, as will be described in greater detail below. However the motor 18 can be located at various other positions, and can take form of other power sources besides an electric motor, such as an internal combustion motor. In the illustrated embodiment, the cart 10 includes a conveyor motor and gear box 21, operatively coupled to the conveyor 20, as will be described in greater detail below.

The cart 10 can include a steering device, in the form of a pair of handlebars 22 in the illustrated embodiment, operatively coupled to the front wheel 16a to enable a user/operator 29 to steer the cart 10 in the desired direction. In one embodiment the steering device/handlebars 22 is/are coupled to a vertically-oriented steering column 24 that is directly coupled to the front wheel 16a, or the axle of the front wheel 16a, to enable quick and sharp turning of the cart 10, which in turn provides a small turning radius to the cart 10.

The cart 10 can include a control panel 26 which can carry operator-controlled switches and/or inputs 28 that are operatively coupled to the motors 18, 21. The inputs 28 thereby enable a user/operator 29 of the cart 10 can control the on/off status of the motors 18, 21, the direction and speed of the motors 18, 21 and thereby the cart 10 and conveyor 20, the operation of brakes, etc. The control panel 26 is coupled to the handlebars 22 and the steering column 24 in the illustrated embodiment but can be positioned at various other locations. In one case, the throttle and/or brakes of the cart 10 can be operated by twisting an associated one of the handlebars 22 (or an outer cover of the handlebar 22) as desired. In one case, when the user/operator 29 releases the throttle, the brakes of the cart 10 are automatically engaged to bring the cart 10 to a stop. However, the operation of the motors 18/21 can be controlled by various controller inputs beyond those specifically shown herein.

The cart 10/frame 12 can include an operator-supporting surface or platform 30 on which a user/operator 29 can stand (see FIG. 9) to grasp the handlebars 22 to provide steering capability and stability to the user/operator 29, while also enabling the user/operator 29 to easily access the control panel 26. In one embodiment, the cart 10 includes a generally triangular guard 32 positioned on the front of the cart 10 and generally surrounding the front half of the front wheel 16a. The guard 32 can be useful to guide items out of the way of cart 10 when the cart 10 is moving forwardly, which can be particularly useful when the cart 10 is used in an agricultural environment where livestock may be present. In one case, a storage device 31, such as a tool box, can be positioned immediately behind the platform 30 and above/adjacent to the storage compartment 14.

The platform 30 can be a horizontally oriented surface configured to receive and support thereon an operator 29 thereon during operation and/or driving of the cart 10. The platform 30 can be positioned relatively low to provide greater stability to the cart 10 when the operator 29 is positioned on the cart 10, particularly when the storage compartment 14 is empty. In one case the platform 30 is positioned below the center of gravity of the cart 10 (in one case, when the cart 10 is unloaded) and/or below a midpoint of a height of the cart 10 and/or storage compartment 14 and/or below a lower 10% in one case, or 20% in another case, of the height of the cart 10 and/or storage compartment 14 and/or below an axle of one or all wheels 16a, 16b and/or below an upper surface of one or all of the wheels 16a, 16b. When the cart 10/storage compartment 14 is loaded, the additional weight can provide further stability and a lower center of gravity. The platform 30 can be coupled to the frame 12 and configured to support an operator 29 thereon in a position (a standing position, in one case) in which the operator 29 can access and operator the handlebars 22/steering device control panel 26/inputs 28 on the control panel 26, where the operator 29 has an average size (e.g. at least about 5' tall in one case or at least about 5'6" tall in another case, with arms of a corresponding average size in one case).

In the illustrated embodiment the cart 10 has exactly three wheels 16 to provide stability to the cart 10 while reducing rolling friction and provide relatively low complexity chassis for the cart 10. However, the cart 10 can have any of other number of wheels 16, including four or more, or two or less. In addition, if desired the cart 10 may lack one or more of the platform 30, steering device/handlebars 22, control panel 26, guard 32, motor 18 and front wheel 16a. In this case, the cart 10 may be able to be used as a trailer and may include only two wheels 16, or in certain cases only a single wheel 16 or other rolling device (considered to be a wheel herein). In the case of the self-propelled cart 10, the cart 10 can include at least three wheels 16 coupled to a single rigid frame 12, where the cart 10 or frame 12 lacks a hitch, tow hitch, coupling, coupling means, tow bar, or other device to enable towing, or lacks any device which can allow swiveling or articulation of a trailer, and/or where the frame 12 does not include any joints that allow swiveling, articulation or pivoting of different portions of the frame 12. In addition, the user/operator 29 may not need to ride on the cart 10, but instead could walk next to/behind the cart 10, and the steering device/handlebars 22 and control panel 26 may be configured/positioned to be accessible to the user/operator 29 when the user/operator 29 is in such a position (e.g. positioned on a back of the cart 10). Thus the cart 10 can be used as a cart 10 upon which the user/operator 29 rides, or as a cart 10 which the user/operator walks beside/behind, or a cart 10 used as a trailer.

Figure 4:
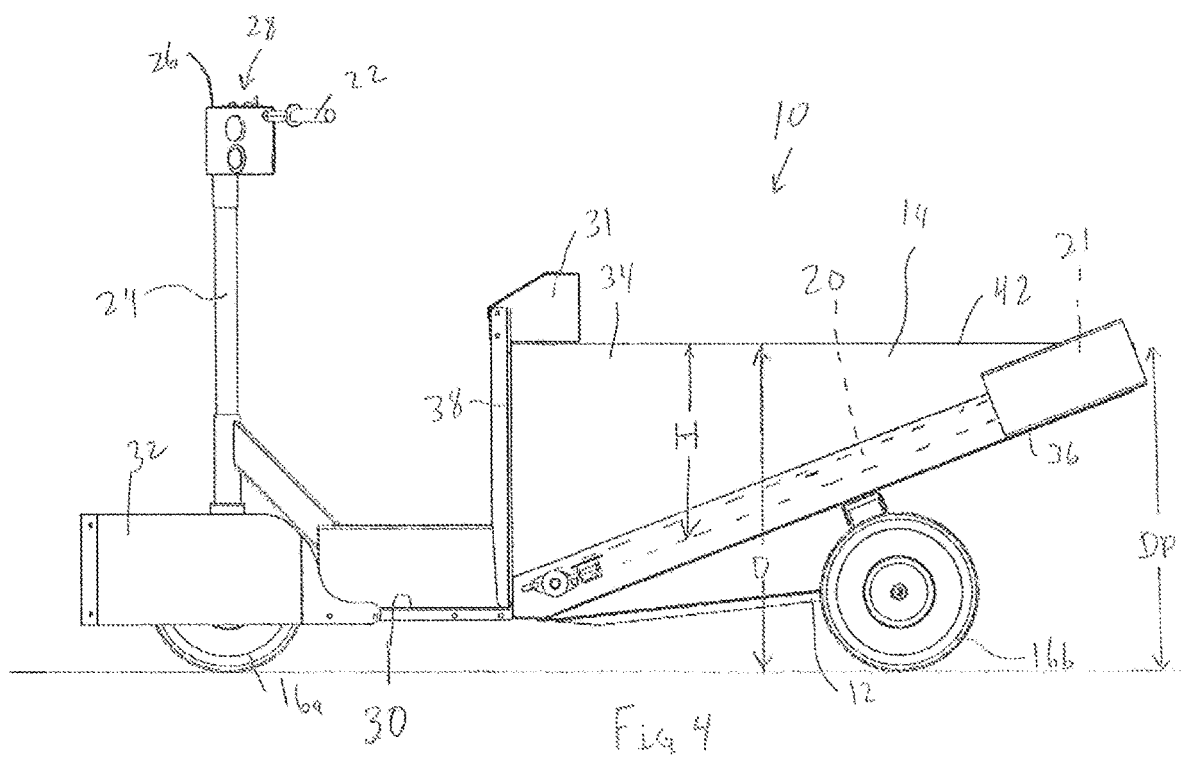
FIG. 4 is a left side view of the cart of FIG. 1.
Figure 6:
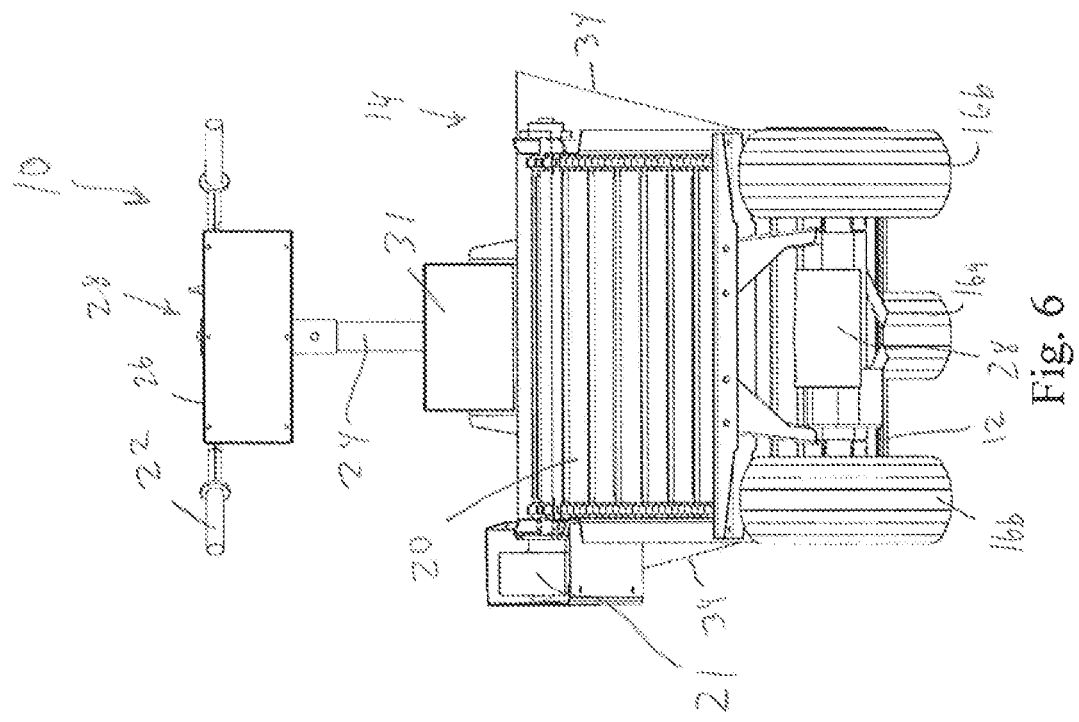
FIG. 6 is a rear view of the cart of FIG. 1.
Figure 5:
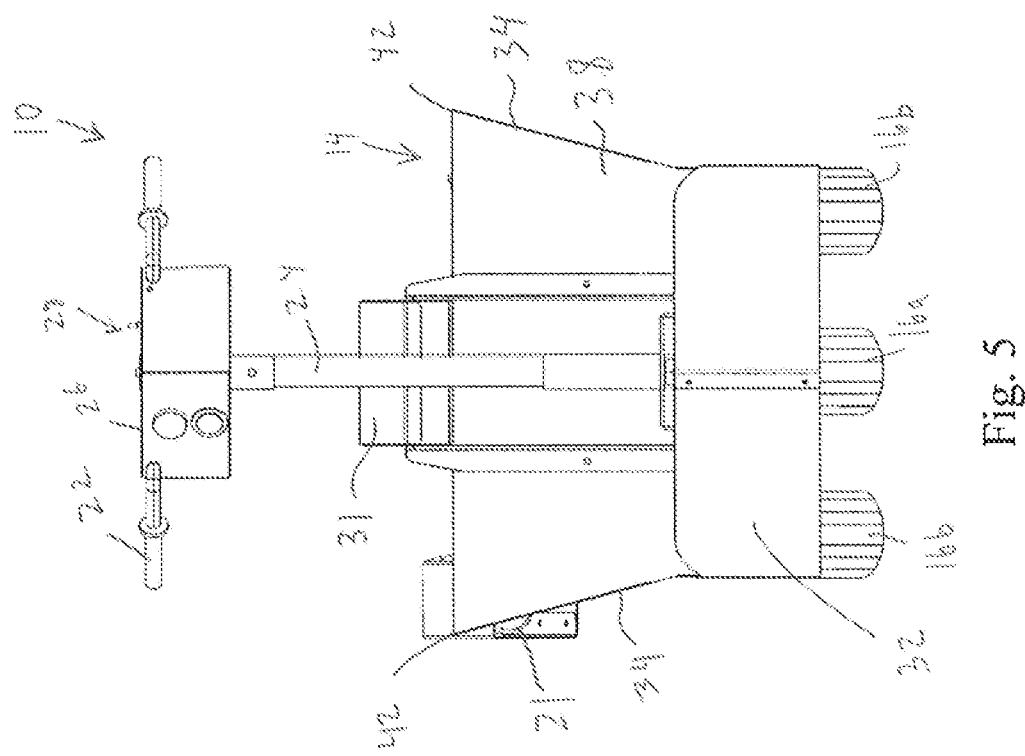
FIG. 5 is a front view of the cart of FIG. 1.
Figure 7:
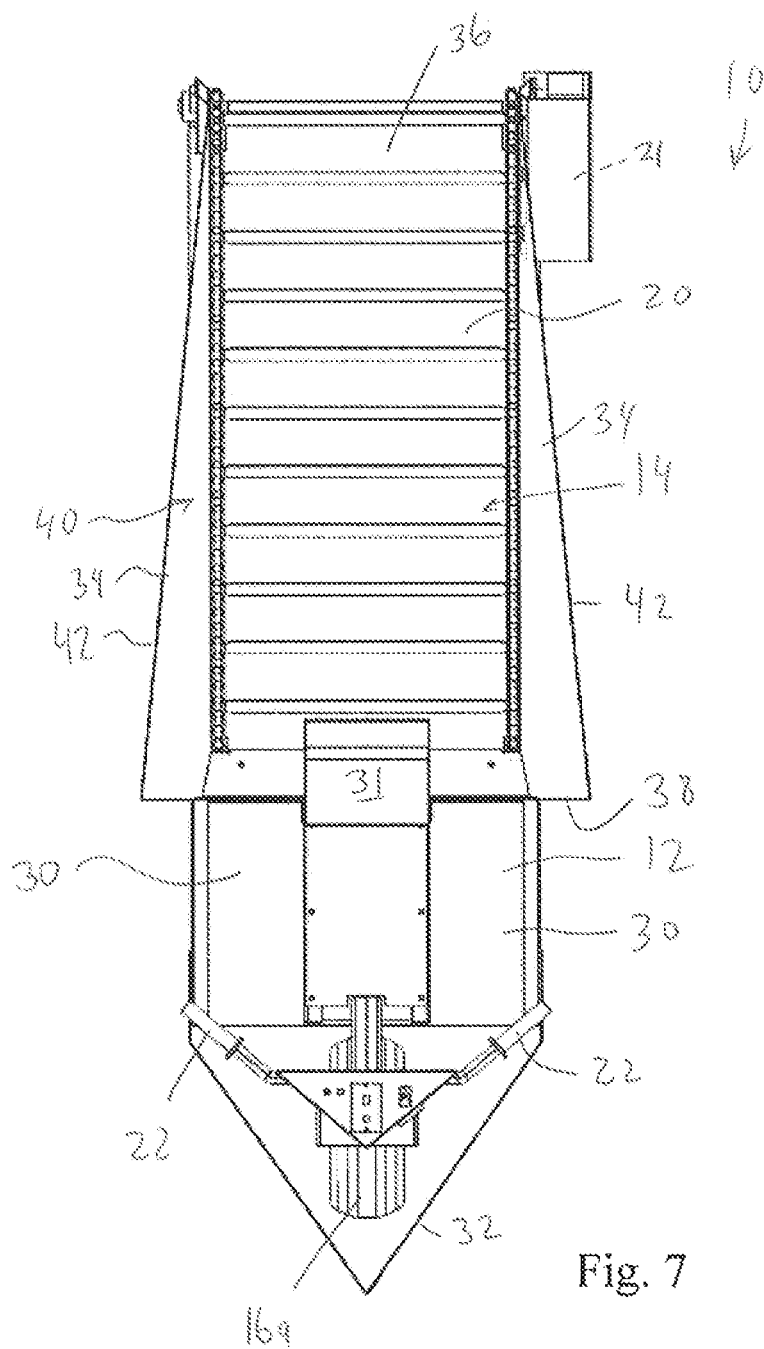
FIG. 7 is a top view of the cart of FIG. 1.

The storage compartment 14 can include a pair of opposed side walls 34, a bottom structure 36 and a front wall 38 defining a storage compartment cavity 40 therebetween. In the illustrated embodiment, one or each of the side walls 34 are oriented generally vertically/aligned in a generally vertical plane (or at an angle relative to a vertical axis of less than about 30 degrees in one case, or less than about 20 degrees in another case) and have a generally triangular shape in front view (side view of the cart 10), as shown in FIG. 4. The entirety, or a portion, of each side wall 34 may be arranged generally vertically. An entirety, or at least a portion, of the upper edge 42 of one or both side walls 34 can extend horizontally or generally horizontally (e.g. in one case, within an angle less than +/-20 degrees relative to horizontal, or in another one case, within an angle less than +/-10 degrees relative to horizontal).

The side walls 34 can taper moving in the rearward direction and the direction of conveyance by the conveyor 20. In other words, side wall height H (FIG. 4) of one or each side wall 34 can be reduced, moving in the rearward direction until, in the illustrated embodiment, the side wall height H of each side wall 34 is zero at the rearmost point of each side wall 34. In other cases, however, the side wall height H may not necessarily taper and/or may taper to an ending height of greater than zero, for example about 6 inches or less in one case, or a height less than about 20 percent of the greatest height of the side wall 34 and/or the height of the side wall 34 at its forward-most position.

The cart 10/side walls 34/front wall 38 may define a distance D that extends between the bottom of wheel(s) 16 (e.g. the ground surface when the cart 10 is in its operating position) and the upper edge 42 of the side walls 34 (and/or the upper edge of the front wall 38). In one case, the distance D is less than forty nine inches or about forty nine inches, or in another case, is less than thirty two inches or about thirty two inches. In one case, the discharge point DP (described in greater detail below) is less than forty nine or about forty nine inches, or in another case, is less than thirty two or about thirty two inches. The distance D can be fixed along the length of the side wall 34, e.g. if the upper edge 42 of the side wall 34 is oriented horizontally. Alternatively the distance D can be variable along the length of the side wall 34, e.g. if the upper edge 42 of the side wall 34 does not extend horizontally along its entire length.

The bottom structure 36 of the storage compartment 14 can, in one case, include or take the form of a conveyor 20 such as a belt conveyor, chain conveyor or the like. In one embodiment the conveyor 20 extends the entire width or generally the entire width of the storage compartment 14, and extends the entire or generally the entire distance between the side walls 34 at the bottom of the storage compartment cavity 40. The conveyor 20 can be positioned at an angle relative to the ground surface/horizontal surface when the cart 10 is in its operating position (e.g. in one case, a position where all wheels 16 rest on the ground surface, and the cart 10 is stably positioned for operation, such as when the lower surface of the storage compartment 14 provides sufficient clearance for usage). The conveyor 20 can be generally straight in one case and arranged at an angle, relative to a horizontal frame of reference, of between about 10 degrees and about 50 degrees in one case, or less than about 50 degrees, or greater than about 10 degrees, or at an angle of about 20 degrees in one particular embodiment. The conveyor 20 may not be parallel to, and be arranged at an angle relative to, the upper edge 42 of one or both side walls 34, in the same ranges as outlined above.

Figure 8:
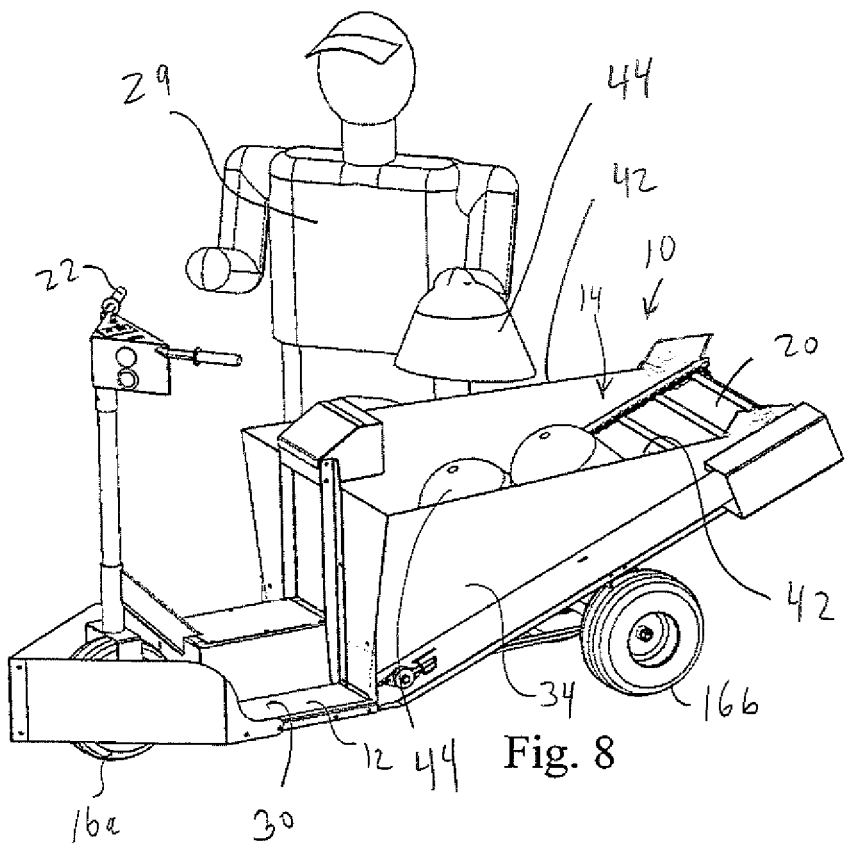
FIG. 8 is a front perspective view of the cart of FIG. 1, shown in conjunction with an operator who is loading contents into the cart.
Figure 9:
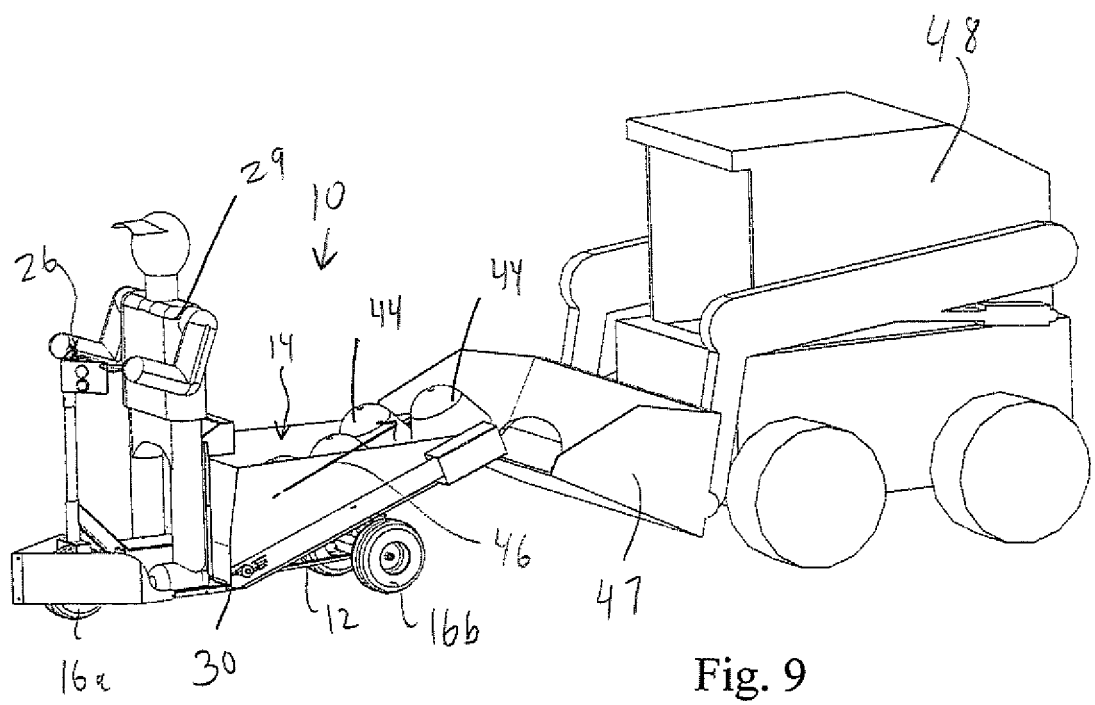
FIG. 9 is a front perspective view of the cart of FIG. 1, shown with the cart automatically unloading contents into a front loader.

In order to utilize the cart 10, the cart 10 can be conveyed, such as by the motor 18 or another conveyance device if the cart is not self-propelled, to a desired location. As shown in FIG. 8, the cart 10 can then be manually loaded by placing items or contents 44 into the cart 10 by direct placement of items 44 into the storage compartment 14/storage compartment cavity 40, or by using a tool such as shovel or rake, etc. The relatively small distance D provides a relatively low loading height for a user/operator 29 when loading the cart 10. In particular the height of the side walls 34/distance D may be sufficiently low to enable an average-sized adult person to relatively easily manually load items into the storage compartment 14. In particular, in one case when the distance D is less than forty nine inches or about forty nine inches, this places the upper edge of the side walls 34 at a height at equal to or less than the average shoulder height of an adult person. Having a distance D greater than forty nine inches can present additional difficulties to a person loading items 44 due to the increased difficulty and ergonomics of loading items (particularly heavy items) at a height above forty nine inches. In particular, since the manual lifting/loading operations are typically primarily carried out by the arms of the user, it takes significantly higher effort to lift a load about the user's shoulders, as the location where the person's arms are attached to their torso.

In another embodiment, when the distance D is about forty one inches or less or forty one inches or less, certain additional loading/ergonomic advantages may be provided in that forty one inches is about the height of the elbow of an average adult, and further ergonomic advantages may be provided by having a distance D at or below the height of the elbow of the user/operator 29. In particular, since the lifting/loading operations are carried out a by user who would typically at least partially bend at the elbow, it takes significantly higher effort to lift a load about the elbow.

In another embodiment, when the distance D is thirty two inches or less or about thirty two inches or less, additional loading/ergonomic advantages are provided in that thirty two inches is about the height of the waist of an average adult, and further ergonomic advantages may be provided by having a distance D at or below the height of the waist of the user/operator 29. In particular, since the lifting/loading operations are carried out a by user who would typically at least partially bend at the waist, it takes significantly higher effort to lift a load about the waist. In addition, a user's arms typically hang down to waist-height, and requiring a user to lift a load above their waist requires the user to lift the load solely with their arms, instead of with their legs (or their legs in combination with their arms).

In addition, the generally horizontal orientation of the upper edge 42 of the side walls 34 and/or the triangular shape of the side walls 34 and/or the tapering height dimension H of the side walls 34 helps to ensure that the loading distance D remains low along at least part, or a majority, or an entirety of the front-to-back length of the cart 10. In other words, if only certain portions of the cart 10/storage compartment 14 were to have a low loading height, this can restrict loading access. In contrast, providing a low loading height across some, a majority, or an entirety of the storage compartment 14 helps to ensure that the user/operator can easily load contents of the storage compartment 14 at any location along the length of the storage compartment 14, which enables a user to load items where the user is located and/or minimizes the distance that the item 44 to be loaded must be carried to be loaded. Providing a low loading height across some, a majority, or an entirety of the storage compartment 14 also helps to ensure multiple users working side-by-side can easily load contents into the cart 10 along the entire length of the storage compartment 14.

After the cart 10 is loaded, the cart 10 can then be transported to the desired unloading location. The conveyor 20 can then be operated (in one case, using its own motor/gear box 21 as the power source) to convey any items 44 in the storage compartment 14 at least partially upwardly and outwardly (e.g. away from the lowest point of the storage compartment 14 in one case) out of the storage compartment 14 as shown by arrow 46 in FIG. 9. Thus the items 44 are moved upwardly and, in this illustrated case, rearwardly, relative to a direction of forward conveyance of the cart 10 in this particular embodiment. The operation of the conveyor 20 can in one case be controlled by the operator-controlled inputs 28 on the control panel 26.

In one case, the conveyor 20 is able to be operated only in a single direction (the rearward direction in one case, or the outward direction) and is blocked or disabled, or simply not enabled due to a lack of gearing or the like, from being able to operate in the forward direction. This can provide simpler controls to the user/operator 29, reduced complexity and weight, and may provide safety features by preventing items 44 from being wedged against the front wall 38. In a further embodiment, the conveyor 20 may be able to be operated in the forward direction on a limited basis, e.g. by limiting forward travel to 12 inches or less in one case, or less than about 10% or less than about 20% of the length of one side of the conveyor 20, to enable jams or kinks of the conveyor 20 to be worked out.

The upwardly angled nature of the conveyor 20 helps to provide greater flexibility in unloading. In particular, the relatively high discharge point DP (FIG. 4) of the cart 10/storage compartment 14 enables unloaded contents 44 to be positioned on top of an existing pile, instead of at ground level or at the bottom of a pile. In addition, the relatively high discharge point DP can enable contents 44 to be unloaded at an elevated position such as in a bucket 47 of a front loader 48 (FIG. 9), or on an elevated platform, or into another cart 10, etc. The discharge point DP may have a height of at least about 32 inches in one case, or at least about 41 inches in another case, or at least about 49 inches in yet another case. The discharge point DP may have a height at least equal to the height of the upper edge 42 of one or both sidewalls 34, or at least about 90% of the height of the upper edge 42 in another case, or at least about 60% of the height of the upper edge 42 in yet another case.

Although not shown in the drawings, in some cases the storage compartment 14 may be able to be tipped/tilted in the manner of a dump truck. In this case the conveyor 20 may still be able to be operated, even when the storage compartment 14 is tipped, to aid in unloading. In this case the conveyor 20 may be oriented generally horizontally, or within +/−20 degrees in one case, or +/−10 degrees in another case, of a horizontal reference (with respect to a gravitational frame of reference), when the storage compartment 14 is in its fully tipped position.

The conveyor 20 thus provides automated and hands-free unloading of contents 44. The angled nature of the conveyor 20 also helps to provide a forwardly located portion of the storage compartment cavity 40 which is relatively low to provide a lower center of gravity, and therefore more stability, to the cart 10. In one embodiment at least part of the conveyor 20 and/or at least part of the storage compartment 14/storage compartment cavity 40 is positioned below an upper surface of one or more of the wheel(s) 16 and/or below the center or an axle of the wheel(s) 16 to provide greater stability.

The generally triangular and tapering nature of the side walls 34 helps to provide ease of unloading in that any unloaded contents 44 may be able to also spill over the side walls 34 of the cart 10 at or near the discharge point during the unloading process to ensure quicker unloading. In some cases however, the side walls 34 may include or be coupled to guide flanges (see e.g. FIG. 8; in one case having a height of about 6 inches or less) to ensure contents of the cart 10 are discharged strictly rearwardly/outwardly and do not spill over the side walls 34 of the cart 10.

Although the invention is shown and described with respect to certain embodiments, it should be clear that modifications will occur to those skilled in the art upon reading and understanding the specification, and the present invention includes all such modifications.

What is claimed is:

1. A conveyance device comprising:
   a frame;
   at least one wheel coupled to the frame;
   a storage compartment coupled to the frame, wherein the at least one wheel is positioned directly below the storage compartment, wherein the storage compartment has a pair of opposed side walls configured such that at least a portion of at least one side wall has an upper edge that is less than 41 inches above a bottom of the at least one wheel to enable manual loading of the storage compartment; and a conveyor positioned in the storage compartment, wherein the conveyor is positioned to convey items in the storage compartment at least partially upwardly and out of the storage compartment, wherein the storage compartment defines a storage compartment cavity configured to receive the items therein, wherein at least a portion of the storage compartment cavity is positioned vertically below an axle of the at least one wheel when the storage compartment is not in a tipped position wherein the storage compartment is at least partially spaced away from the frame, and wherein the conveyor is generally straight and forms an angle of between about 10 degrees and about 50 degrees relative to a horizontal reference line.

2. The device of claim 1 wherein a majority of the upper edge of the at least one side wall is less than 41 inches above the bottom of the at least one wheel.

3. The device of claim 1 wherein the upper edge of the at least one side wall is less than 32 inches above the bottom of the at least one wheel.

4. The device of claim 1 wherein the upper edge of the at least one side wall extends generally horizontally for a majority of a length of the side wall.

5. The device of claim 1 wherein the at least one side wall is generally triangular in front view of the side wall.

6. The device of claim 1 wherein the at least one side wall has a reduced side wall height moving in a direction toward a back of the conveyance device.

7. The device of claim 1 wherein the at least one side wall tapers to a side wall height of less than about 6 inches at or adjacent to a back of the conveyance device, and wherein the conveyor is a belt or chain conveyor.

8. The device of claim 1 further comprising a steering device operatively coupled to another wheel, and an operator-supporting surface coupled to the frame and configured to support an operator thereon in a position in which an average adult-sized operator can access and operate the steering device, wherein the operator-supporting surface is positioned below a center of gravity of the conveyance device.

9. The device of claim 1 wherein each side wall is generally vertically oriented, and wherein the conveyor is positioned at a bottom of the storage compartment, and wherein the conveyor is configured to discharge items at a discharge point having a height at least about 90% of a height of the upper edge.

10. The device of claim 1 wherein the conveyance device further includes a motor coupled to the frame and operatively coupled to the at least one wheel such that the conveyance device is a self-propelled cart, and a steering device that is manually operable by an operator to guide movement of the conveyance device, wherein the steering device is located at a front of the conveyance device.

11. The device of claim 1 further comprising at least two additional wheels coupled to the frame, a motor coupled to the frame and operatively coupled to at least one wheel, and wherein at least part of an upper edge of at least one side wall extends generally horizontally.

12. The device of claim 1 wherein the conveyor is generally straight and forms an angle of between about 10 degrees and about 50 degrees relative to the horizontal reference line along substantially an entire length of the conveyor.

13. A conveyance device comprising:
a frame;
at least one wheel coupled to the frame;
a storage compartment coupled to the frame, wherein the at least one wheel is positioned directly below the storage compartment, wherein the storage compartment has a pair of opposed side walls configured such that at least a portion of at least one side wall has an upper edge that is less than 41 inches above a bottom of the at least one wheel to enable manual loading of the storage compartment; and
a conveyor positioned in the storage compartment, wherein the conveyor is positioned to convey items in the storage compartment at least partially upwardly and out of the storage compartment, wherein the conveyor is arranged at an angle relative to the upper edge of the at least one side wall, wherein the storage compartment defines a storage compartment cavity configured to receive the items therein, wherein at least a portion of the storage compartment cavity is positioned vertically below an axle of the at least one wheel when the storage compartment is not in a tipped position wherein the storage compartment is at least partially spaced away from the frame, wherein the conveyance device is configured to be primarily conveyed in a forward direction, and wherein the conveyor is positioned and configured to convey items in the storage compartment upwardly and rearwardly, opposite to the forward direction, out of the storage compartment.

14. A conveyance device comprising:
a frame;
at least one wheel coupled to the frame;
a motor coupled to the frame and operatively coupled to the at least one wheel;
a storage compartment coupled to the frame;
a belt or chain conveyor positioned in the storage compartment, wherein the conveyor is positioned to convey items in the storage compartment at least partially upwardly and out of the storage compartment when the storage compartment is in an operating position wherein the storage compartment is positioned adjacent to the frame along a front-to-rear direction of the storage compartment;
a steering device that is manually operable by an operator to guide movement of the conveyance device; and
an operator-supporting surface coupled to the frame and configured to support an operator thereon in a position in which an average adult-sized operator can access and operate the steering device, wherein the operator-supporting surface is positioned entirely in front of the conveyor, with respect to a direction of movement of the conveyance device and below a center of gravity of the conveyance device when the storage compartment is in the operating position, and wherein the storage compartment defines a storage compartment cavity configured to receive the items therein, and at least a portion of the storage compartment cavity is positioned vertically below an axle of the at least one wheel.

15. The device of claim 14 further comprising a control panel coupled to the frame, the control panel including at least one of a switch or an input that is operatively coupled to the conveyor, wherein the operator-supporting surface is configured to support an operator thereon in a position in which an average adult-sized operator can access and operate the control panel.

16. The device of claim 14 wherein the conveyor is arranged at an angle relative to an upper edge of at least one side wall of the storage compartment, and wherein the storage compartment is in the operating position when an entire length of the storage compartment is positioned adjacent to the frame along a front-to-rear direction of the storage compartment.

17. The device of claim 14 wherein the at least one wheel is positioned directly below the storage compartment.

18. The device of claim 14 wherein the conveyance device includes exactly three wheels coupled to the frame and supporting a weight of the frame.

19. A conveyance device comprising:
a frame;
at least one wheel coupled to the frame;
a storage compartment coupled to the frame, wherein the at least one wheel is positioned directly below the storage compartment, wherein the storage compartment has a pair of opposed side walls configured such that at least a portion of at least one side wall is sufficiently low to enable an average-sized adult person, directly standing on an elevation equal to that of a bottom of the at least one wheel, to manually load items over the at least one side wall and drop the loaded items into the storage compartment; and
a belt or chain conveyor positioned in the storage compartment, wherein the conveyor is positioned to convey items in the storage compartment at least partially upwardly and out of the storage compartment when the storage compartment is not in a tipped position wherein the storage compartment is at least partially spaced away from the frame, and wherein the storage compartment defines a storage compartment cavity configured to receive the items therein, and at least a portion of the storage compartment cavity is positioned vertically below an axle of the at least one wheel when the storage compartment is not in the tipped position.

20. The device of claim 19 wherein the conveyor is arranged at an angle relative to an upper edge of the at least one side wall.

* * * * *